United States Patent
Wang (10) Patent No.: US 6,728,396 B2
(45) Date of Patent: Apr. 27, 2004

(54) INDEPENDENT COMPONENT IMAGING (75) Inventor: Yue Joseph Wang, North Potomac, MD (US)

(73) Assignee: Catholic University of America, Washington, DC (US)

( * ) Notice: Subject to any disclaimer, the term of this patent is extended or adjusted under 35 U.S.C. 154(b) by 0 days.

(21) Appl. No.: 10/370,565

(22) Filed: Feb. 24, 2003

(65) Prior Publication Data

US 2003/0161527 A1 Aug. 28, 2003

Related U.S. Application Data

(60) Provisional application No. 60/358,891, filed on Feb. 25, 2002.

(51) Int. Cl.⁷ ................................................ G06K 9/00
(52) U.S. Cl. ........................................ 382/129; 128/922
(58) Field of Search ................................ 382/128, 129, 382/130, 131, 132, 133, 134; 434/279; 435/69.1, 91.4, 91.21, 91.51, 235.3, 333, 477; 436/94, 508; 424/1.73, 801; 128/922

(56) References Cited

U.S. PATENT DOCUMENTS

| 5,560,360 A | * 10/1996 | Filler et al. ................. 600/408 |
| 5,613,013 A | 3/1997 | Schuette |
| 5,630,154 A | 5/1997 | Bolstad et al. |
| 5,706,402 A | * 1/1998 | Bell ............................ 706/22 |
| 5,859,930 A | 1/1999 | Chase |
| 5,892,960 A | 4/1999 | Seide |
| 5,987,094 A | 11/1999 | Clarke et al. |
| 6,058,248 A | 5/2000 | Atkins et al. |
| 6,064,958 A | 5/2000 | Takahashi et al. |
| 6,167,156 A | * 12/2000 | Antoniades et al. ........ 382/232 |
| 6,358,523 B1 | 3/2002 | Safinya et al. |
| 6,360,021 B1 | * 3/2002 | McCarthy et al. .......... 382/254 |
| 6,396,422 B1 | 5/2002 | Barkan |
| 6,430,528 B1 | * 8/2002 | Jourjine et al. ............. 702/200 |

* cited by examiner

Primary Examiner—Jayanti K. Patel
Assistant Examiner—Abolfazl Tabatabai
(74) Attorney, Agent, or Firm—Jagtiani + Guttag (57) ABSTRACT

The present invention describes a partial independent component analysis (PICA) technique for blindly separating partially independent and/or gaussian-like sources from mixed observations over an informative index subspace, which allows various applications in independent component imaging. The present invention estimates a demixing matrix using only the independent and/or nongaussian portion of the observations. Specifically, rather than using all the data points which give rise to a large separation error, a subset of the data points is identified such that the partial source profiles defined over such a subset are statistically independent and/or nongaussian. The present invention describes a complete implementation of such a technique, whose steps and parameters may be achieved and estimated using an information theoretic-based neural computational algorithm. The present invention also demonstrates the principle of the approach on both controlled cases and real-world problems, and describes many extended applications of such a technique.

18 Claims, 7 Drawing Sheets

Left: true profiles. Right: recovered profiles

INDEPENDENT COMPONENT IMAGING

CROSS-REFERENCE TO RELATED APPLICATIONS

This application makes reference to U.S. Provisional Patent Application No. 60/358,891, entitled "Independent Component Imaging," filed Feb. 25, 2002. The entire disclosure and contents of the above application is hereby incorporated by reference.

BACKGROUND OF THE INVENTION

1. Field of the Invention

The present invention relates generally to statistical signal processing and its application to imaging, and more particularly to a method and/or associated apparatus for independent component imaging from mixed observations.

2. Description of the Prior Art

Spotted cDNA microarrays promise powerful new tools for the large-scale analysis of gene expression. Using this technology, the relative mRNA expression levels derived from tissue samples may be assayed for thousands of genes simultaneously. Such global views are likely to reveal previously unrecognized patterns of gene regulation and generate new hypotheses warranting further study as shown by J. Khan, J. S. Wei, M. Ringner, L. H. Saal, M. Lananyi, F. Westermann, F. Berthold, M. Schwab, C. R. Antonescu, C. Peterson, and P. S. Meltzer, "Classification and diagnostic prediction of cancers using gene expression profiling and artificial neural networks," *Nature Medicine*, vol. 7, no. 6, pp. 673–679, June 2000 [hereinafter Khan et al.]; and T. R. Golub, D. K. Slonim, P. Tamayo, C. Huard, M. Gaasenbeek, J. P. Mesirov, H. Coller, M. L. Loh, J. R. Downing, M. A. Caligiuri, C. D. Bloomfield, and E. S. Lander, "Molecular classification of cancer: class discovery and class prediction by gene expression monitoring," *Science*, vol. 286, pp. 531–537, October 1999 [hereinafter Golub et al.], the entire contents and disclosures of which are hereby incorporated by reference herein. On the other hand, remarkable advances have been made in developing molecular-targeted contrast agents, ligands and imaging probes. Such imaging capabilities may allow for the visualization and elucidation of important disease-causing physiologic and molecular processes in living tissue, as shown by Z. Szabo, P. F. Kao, W. B. Mathews, H. T. Ravert, J. L. Musachio, U. Scheffel, and R. F. Dannals, "Positron emission tomography of $5^{HT}$ reuptake sites in the human brain with $C^{11}McN5652$ extraction of characteristic images by artificial neural network analysis," *Behavioural Brain Research*, vol. 73, pp. 221–224, 1996 [hereinafter Szabo et al.]; as well as L. Cinotti, J. P. Bazin, R. DiPaola, H. Susskind, and A. B. Brill, "Processing of $Xe^{127}$ regional pulmonary ventilation by factor analysis and compartmental modeling," *IEEE Trans. Med. Imaging*, vol. 10, no. 3, pp. 437–444 (1991), the entire contents and disclosures of which are hereby incorporated by reference herein.

One of the major bottlenecks in molecular imaging is the ability to make sense of and interpret information derived from clinical-setting sources. For example, in the case of solid tumors, one of the challenges is the partial volume effect, i.e., the heterogeneity within the tumor samples caused by stromal contamination, as shown in Khan et al. and Golub et al. Blind application of microarray expression and data analysis could result in extracting signatures reflecting the proportion of stromal contamination in the sample, rather than underlying tumor biology. Effective computational tools that exclude gene expressions in stromal cells are highly desirable. In addition, imaging neurotransporters in the brain requires the passage of radioligands across the blood brain barrier with high lipophilicity. But lipophilicity carries the risk of high nonspecific binding and retention in the white matter and may result in a bias of the estimated kinetic parameters that are used to measure binding to specific recognition sites, as shown by Szabo et al. Separation of the mixed bindings is important for finding the true distribution of specific binding sites in comparative studies.

There exist algorithmic methodologies that include, for example, Independent Component Analysis (ICA), which is primarily a mathematical theory, and a FastICA algorithm, which is a neural network implementation of the ICA principles that are publicly available, as well as several modifications to these methodologies. However, the applications of ICA/FastICA techniques to real-world problems are limited. The fundamental methodologies suffer from key restrictions, such as that the underlying sources must be completely statistically and mutually independent with nongaussian distributions, which is hard to accomplish in most real-world situations. Thus, there is a need for improvement of ICA methodology with regard to such restrictions and for enlarged applications of such improved technology to independent component imaging.

SUMMARY OF THE INVENTION

It is therefore an object of the present invention to provide a statistically-principled neural computation approach/algorithm to partial independent component analysis.

It is a further object of the present invention to provide such a partial independent component analysis approach to independent component imaging.

It is a further object of the present invention to provide an apparatus for conducting a partial independent component analysis for independent component imaging.

It is a further object of the present invention to provide an index selection method and apparatus to identify an index subspace defining the observations of the sources such that over such index subspace, the source signals/images are independent, or at least more independent than the original signals/images.

It is a further object of the present invention to provide an index selection method and apparatus to identify an index subspace defining the observations of the sources such that over such index subspace, the source signals/images are nongaussian, or at least less gaussian than the original signals/images.

It is a further object of the present invention to provide a linear and/or nonlinear regression/correlation analysis over a scatter plot (i.e., joint distribution of the source samples) to measure the contributions of each index to the independence between the sources and/or nongaussianities.

It is a further object of the present invention to provide an apparatus for conducting linear and/or nonlinear regression/correlation analysis over a scatter plot (i.e., joint distribution of the source samples) to measure the contributions of each index to the independence between the sources and/or nongaussianities.

It is a further object of the present invention to provide a linear and/or nonlinear regression/correlation analysis through weighted Fisher criterion based cluster analysis (i.e., separability) to measure the contributions of each index to the independence between the sources using multiple realizations.

It is a further object of the present invention to provide an apparatus for conducting a linear and/or nonlinear regression/correlation analysis through weighted Fisher criterion based cluster analysis (i.e., separability) to measure the contributions of each index to the independence between the sources using multiple realizations.

It is a further object of the present invention to provide an iterative normalization method and apparatus that may solve the ambiguity problems associated with conventional ICA (i.e., rescaling and permutation).

It is a further object of the present invention to apply ICA and/or PICA methods to partial volume correction in microarray expression studies (mRNA and protein).

It is a further object of the present invention to apply ICA and/or PICA methods to binding separation in dynamic positron emission tomography studies.

It is a further object of the present invention to apply ICA and/or PICA methods to binding separation in receptor imaging by positron emission tomography and magnetic resonance imaging where single or multiple imaging probes are used.

It is a further object of the present invention to apply ICA and/or PICA methods to signal separation in gene expression imaging by positron emission tomography and optical imaging where single or multiple imaging probes are used.

It is a further object of the present invention to apply ICA and/or PICA methods to signal separation in anatomic imaging by multiple energy x-ray and/or by multi-spectrum projective ultrasound.

It is a further object of the present invention to apply ICA and/or PICA methods to fundamental factor extraction in gene regulation studies (i.e., regulatory network, pathway discovery) based on time course gene expressions.

It is a further object of the present invention to apply ICA and/or PICA methods to change detection and analysis in existing and future imaging studies where the images of the same subject are taken over a period of time.

It is a further object of the present invention to apply ICA and/or PICA methods to signal separation in existing and future anatomic, function, and molecular imaging where the detected signals are the mixture of several underlying sources.

According to a first broad aspect of the present invention, a method for analyzing images is provided comprising the steps of acquiring a digital image of an observation, the digital image being observation data; vectorizing the observation data to generate an observation vector $x(i)$; determining a de-mixing matrix $W$; determining an output vector $y(i)=Wx(i)$; recovering a source vector $S(i)$, where $S(i)=y(i)$; and utilizing the source vector $S(i)$ to analyze the image.

According to a second broad aspect of the present invention, an apparatus for analyzing images is provided comprising means for acquiring a digital image of an observation, the digital image being observation data; means for vectorizing the observation data to generate an observation vector $x(i)$; means for determining a de-mixing matrix $W$; means for determining an output vector $y(i)=Wx(i)$; means for recovering a source vector $S(i)$, where $S(i)=y(i)$; and means for utilizing the source vector $S(i)$ to analyze the image.

According to a third broad aspect of the present invention, an apparatus for analyzing images is provided comprising (A) means for acquiring a digital image of an observation, the data image being observation data; (B) means for vectorizing the observation data to generate an observation vector $x(i)$; (C) means for determining a de-mixing matrix $W$, wherein said de-mixing matrix is determined by using an apparatus comprising (1) means for centering observation data to make its mean zero and where $C=E[xx^T]$; (2) means for choosing an initial demixing matrix $W$; (3) means for computing $y=Wx$, $\beta_k=-E[y_k g(y_k)]$, $\alpha_k=-(\beta_k+E[g'(y_k)])^{-1}$, for $k=1,\ldots,m$ (4) means for updating $W$ by $W+\mathrm{diag}(\alpha_k)(\mathrm{diag}(\beta_k)+E[(g)(y)(y)^T])W$; and (5) means for decorrelating and normalizing by $W \leftarrow (WCW^T)^{-1/2}W$; (D) means for determining an output vector $y(i)=Wx(i)$, wherein said output vector is determined by an apparatus comprising (1) means for estimating $y^{(j)}=W^{(j)}x$ by FastICA over F for $j=0$; (2) means for identifying index subspace I according to:

$$\left|\frac{ay_1(i)}{y_2(i)} - 1\right| \geq \epsilon, \text{ where } a = \sum_{i=1}^{d} \frac{y_1(i)}{y_2(i)} \Big/ \sum_{i=1}^{d} \frac{y_1(i)^2}{y_2(i)^2};$$

(3) means for estimating $y^{(j+1)}=W^{(j+1)}y^{(j)}$ by FastICA over I; and (4) means for computing $y^{(j+1)}=W^{(j+1)}y^{(j)}$ over F−I; (E) means for recovering a source vector $S(i)$, where $S(i)=y^{(\infty)}$; and (F) means for utilizing the source vector $S(i)$ to analyze the image.

Other objects and features of the present invention will be apparent from the following detailed description of the preferred embodiment.

BRIEF DESCRIPTION OF THE DRAWINGS

The invention will be described in conjunction with the accompanying drawings as examples, in which.

DETAILED DESCRIPTION OF THE PREFERRED EMBODIMENT

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "independent component analysis (ICA)" refers to a statistical and/or neural computation technique for separating hidden sources from mixed signals.

For the purposes of the present invention, the term "independent component imaging (ICI)" refers to a statistical and/or neural computation technique for separating hidden sources from mixed multidimensional (including one-dimensional) signals. An alternative term is "independent component reconstruction".

For the purposes of the present invention, the term "partially independent component analysis (PICA)" refers to a statistical and/or neural computation technique for separating hidden sources from mixed signals that only requires that the sources be at least partially statistically and mutually independent (i.e., there exists an index subspace defining the source observations over which the sources are statistically and mutually independent).

For the purposes of the present invention, the term "Fast-independent component analysis (FastICA)" refers to a group of efficient computational algorithms that estimate the basic ICA model.

For the purposes of the present invention, the term "Fast-partially independent component analysis (FastPICA)" refers to a group of efficient computational algorithms, as an extension of FastICA, that estimate the partial ICA model.

For the purposes of the present invention, the term "positron emission tomography (PET)" refers to a tomographical imaging technique that uses ligands or substrates labeled with positron-emitting radioisotopes to image physiological processes or molecular events.

For the purposes of the present invention, the term "principle component analysis (PCA)" refers to a statistical data analysis method that aims to extract the principal components of the data set.

For the purposes of the present invention, the term "factor analysis (FA)" refers to a statistical data analysis method that aims to extract the hidden factors from mixed signals.

For the purposes of the present invention, the term "partial volume correction (PVC)" refers to a specifically designed computational analysis tool that excludes gene expression profiles in stromal cells.

For the purposes of the present invention, the term "blind partially-independent source separation (BPISS)" refers to a statistical and/or neural computation technique for separating hidden sources from mixed signals, without any prior knowledge about the sources and mixing model, that only requires that the sources must be at least partially statistically and mutually independent (i.e., there exists an index subspace defining the source observations over which the sources are statistically and mutually independent).

For the purposes of the present invention, the term "analyze an image" refers to a process whereby the components of an image are separated for use in application-domain defined goals (e.g., molecular classification of cancers, image-based diagnosis, etc.).

Description

The present invention describes generally a method and apparatus for partially-independent component imaging based on composite observations over an informative subspace. The demixing matrix is derived from the independent and/or nongaussian portions of the observations that are identified and separated from the entire set of data points collected during the imaging. This technique is powerful and promises new imaging paradigms in which composite signature imaging may be realized when data is acquired using multi-probe, multi-spectrum, multi-kinetic, and multi-energy processes. The method of the present invention also avoids the large separation error that occurs when factor images are created using all of the data points collected and then using conventional independent component analysis.

In particular, the present invention describes a neural computation approach to independent component imaging. One preferred embodiment of the present invention separates mixed imagery sources blindly over an informative index subspace. The recovery of patterns may be achieved by independent component analysis, whose parameters may be estimated using the infomax principle. The present invention also makes use of the theoretic roadmap of the approach, and its applications, for example, to partial volume correction in cDNA microarray expression and neurotransporter binding separation in positron emission tomography.

Prior imaging methods involving dual-energy for chest x-rays are discussed by Wataru Ito, et al., "Improvement of Detection in Computed Radiography by New Single-Exposure Dual-Energy Subtraction," in *Medical Imaging VI. Image Processing*, vol. 1652, 386–96, (1992), the entire contents and disclosure of which is hereby incorporated by reference herein. To obtain an image through energy subtraction processing, one may use either a single exposure method or a dual exposure method. The single exposure method is advantageous because one exposure creates less misregistration due to body movement. X-ray energy is separated through the insertion of a metal filter between two imaging plates. In the single exposure method, a full spectrum energy image is recorded on a first imaging plate (IP) in front of a metal filter and a high-energy image is recorded on a second IP on the reverse side of the filter. Thus, the high-energy image will show less contrast.

Using such prior methods, different tissue and bone have different absorption characters for x-rays. A detector detects the number of the photon that is the function of the object's type and exposure time. The image is generated by the x-rays, and its respective intensity is the function of the x-rays received at the image plate. The film itself is a non-linear response to the received photons. The above situation could be represented by the following equation: Det=f(types; exposure time); Intensity=g(Det).

In practice, a phantom may be used to gather information about the above processing parameters that establishes some relationship between the intensity (observations) of the film and the type of the objects (targets). An H&D curve (x-ray exposure with respect to optical density) is generated to find the relationship between the targets and observations.

The prior method involves two steps. First, the physical phantom measurement of the imaging system is used to determine a demixing matrix. The first step is not done mathematically. Second, mathematical methods are used to reduce the noise. The second noise reduction step is necessary in prior methods.

The present invention is different from such prior methods in that the present invention uses mathematical calculations in this first step and noise reduction may be omitted without impairing the results. The present invention is advantageous over prior methods because, for example, the first step does not have to be adapted to each patient or subject, which saves costs and time and increases efficiency.

The present invention involves the use of independent component analysis (ICA), which is a statistical and neural computation technique for separating hidden sources from mixed signals, as discussed by A. Hyvärinen, J. Karhunen, and E. Oja, *Independent Component Analysis*, New York: John Wiley (2001), the entire contents and disclosure of which is hereby incorporated by reference herein. ICA generally defines a generative model for the observed multivariate data, where the data variables may be assumed to be mixtures of some unknown latent variables, and the mixing system is also unknown. When the latent variables are nongaussian and mutually independent, these independent components may be found by ICA, as shown by S. Haykin, *Neural Networks: A Comprehensive Foundation*, 2nd ed., New Jersey: Prentice-Hall (1999), the entire contents and disclosure of which is hereby incorporated by reference herein.

The methods of the present invention may also be useful for gaussian sources, which relaxes another restriction of conventional ICA; namely, the sources must by nongaussian.

To rigorously describe ICA, a random source vector may be defined as follows: $s(i)=[s_1(i), s_2(i), \ldots, s_m(i)]^T$, where the m components may be supplied by statistically mutually independent nongaussian sources. The vector s(i) may be applied to a linear system whose input-output characterization may be defined by a nonsingular m×m matrix A, also referred to as the mixing matrix. The result may be a m×1 observation vector $x(i)=[x_1(i), x_2(i), \ldots, x_m(i)]^T$ related to s(i) as shown in equation 1 below:

$$x(i)=As(i), \quad \text{Equation 1}$$

which describes how the observed data may be generated by a process of mixing the latent components.

The source vector s(i) and the mixing matrix A may be both unknown. Possibly, the observation vector x(i) may be known. Given x(i), the task is to find a demixing matrix; W, such that the original source vector s(i) may be recovered from the output vector y(i), as shown below in equation 2:

$$y(i)=Wx(i), \quad \text{Equation 2}$$

where the source signals s(i), the observation vector x(i), and the demixer signals y(i), may be all zero-mean signals, over an informative index space i=1, 2, . . . , n. The blind source problem may be presented as follows: "Given n independent realizations of the observation vector x(i), find an estimate of the inverse of the mixing matrix A."

A solution to this unsupervised learning problem may be feasible by ICA, except for an arbitrary scaling of each signal component and permutation of indices. In other words, it may be possible to find a demixing matrix W whose individual rows are a rescaling and permutation of those of the mixing matrix A. ICA may be viewed as an extension of principal component analysis (PCA) or factor analysis (FA). Whereas PCA/FA may only impose independence up to the second order while constraining the direction vectors to be orthogonal, ICA imposes statistical independence on the individual components of the output vector and has no orthogonality constraint. ICA may, in particular situations, be capable of finding the underlying sources when the classic methods fail completely.

There may be several ways for estimating the model of ICA including maximization of nongaussianity and maximum likelihood. Most estimation principles and objective functions are equivalent, at least in theory. Suggested by information theory, an elegant and yet rigorous framework for ICA estimation may be the utility of the infomax principle. This may be based on maximizing the output entropy of a neural network, as shown below in equation 3:

$$H(y) = \sum_{k=1}^{m} H(y_k) - I(y_1, y_2, \ldots, y_m), \quad \text{Equation 3}$$

wherein I(.) denotes the mutual information, a well-motivated information-theoretic measure of statistical dependence. It may be shown that maximizing such output entropy is equivalent to maximizing the mutual information between the input x and the output y (i.e., information flow), maximizing the expectation of the likelihood, and minimizing the mutual information between m output variables. A FastICA algorithm has been developed and is recapitulated as follows:

1. Center the data to make its mean zero and $C=E[xx^T]$;
2. Choose an initial demixing matrix W;
3. Compute $y=Wx$, $\beta_k=-E[y_k g(y_k)]$, $\alpha_k=-(\beta_k+E[g'(y_k)])^{-1}$, for k=1, . . . , m;
4. Update W by $W+\text{diag}(\alpha_k)(\text{diag}(\beta_k)+E[(g)(y)(y)^T])W$;
5. Decorrelate and normalize by $W \leftarrow (WCW^T)^{-1/2}W$; and
6. If not converged, go back to step 3, where the nonlinear function g may be the tanh function and the expectations may be the sample averages.

Partial Volume Correction in Microarray Expression

Based on gene expression profiling using cDNA microarrays, the representation of each sample is described as a point in a d-dimensional gene expression space in which each axis represents the expression level of one gene. In carrying out comparisons of expression data using measurements from multiple arrays, the question of normalizing data arises, and the expression levels of each gene in m samples shall be regarded as defining a point in m-dimensional space, as shown by Y. Wang, J. Lu, R. Lee, Z. Gu, and R. Clarke, "Iterative normalization of cDNA microarray data," *IEEE Trans. Info. Tech. Biomed.*, vol. 6, no. 1 (March 2002), the entire contents and disclosure of which is hereby incorporated by reference herein. As aforementioned, biopsy samples, although providing a gene expression pattern of tumor growth in vivo, might have gross differences in the proportion of surrounding stromal cells. Such "contaminations" would typically not be of biomedical interest. Based on a priori knowledge that the biopsy samples contain both malignant and stromal cells, the present invention proposes to separate these two sources using an ICA technique.

Over an informative index space F={i=1, . . . , n−1, n, n+1, . . . , d}, let $s_1(i)$ and $s_2(i)$ be the expression levels of gene i supplied by two tissue sources, i.e., malignant and stromal cells. The result is a 2×1 observation vector related to a gene expression profile, as shown below in equation 4:

$$x(i)=As(i) \quad \text{Equation 4}$$

where $x_1(i)$ and $x_2(i)$ are the observed mixed expression levels of gene i derived from two biopsy samples. The task is to estimate the inverse of the mixing matrix A and recover the source profiles s(i). This is referred to herein as partial volume correction (PVC). PVC exploits primarily spatial diversity in that the tissue samples taken from different locations producing realizations of the observation carry different mixtures of the sources.

Direct application of a prior art ICA technique to PVC, however, often leads to an unsatisfactory recovery of s(i). By a closer look at the joint distribution of the source profile s(i) or their initial estimate $y^{(0)}(i)$, it has been determined that they are not statistically independent over F, thus the basic ICA model does not hold anymore. This should not be a surprise since a reasonable assumption, suggested by molecular biology, is that the expression levels of most genes are expected to be unchanged over most circumstances across different phenotypes, and normalization is carried out based on these constantly expressed genes. A good source separation may be achieved using a subset of differentially expressed genes, since the partial source profiles defined over such a subset are more independent and their marginal densities are far away from the gaussian density than the original source profiles and their densities defined over F.

The present invention uses a partial ICA (PICA) technique to PVC. Rather than using all the genes which give rise to a large separation error, the present invention attempts to iteratively identify an informative index subspace $I=\{i=1, \ldots, n-1, n\}$ consisting of only differentially expressed genes and over which to separate mixed expression profiles. A PICA technique may be furnished by constructing a geometric criterion over the scatter plot (i.e., joint distribution) of $y^{(0)}(i)$ (or x(i)) defining the informative index subspace I. Specifically, gene i will be selected as a member of I if its expression levels across two samples satisfy equation 5:

$$\left|\frac{ay_1(i)}{y_2(i)} - 1\right| \geq \epsilon, \text{ where } a = \sum_{i=1}^{d} \frac{y_1(i)}{y_2(i)} / \sum_{i=1}^{d} \frac{y_1(i)^2}{y_2(i)^2}, \quad \text{Equation 5}$$

where $\epsilon$ is an empirically-determined threshold and the performance of separation highly depends on I. Before a good index subspace I may be identified, an original source profile defined over F needs to be reasonably estimated. The estimation is, after all, the ultimate goal of separation for PVC by PICA. A FastPICA algorithm may thus be summarized as follows:
1. Estimate $y^{(j)}=W^{(j)}x$ by FastICA over F for j=0;
2. Identify index subspace I according to Equation 5;
3. Estimate $y^{(j+1)}=W^{(j+1)}y^{(j)}$ by FastICA over I;
4. Compute $y^{(j+1)}=W^{(j+1)}y^{(j)}$ over F–I; and
5. If not converged, go back to step 2.

Figure 1:
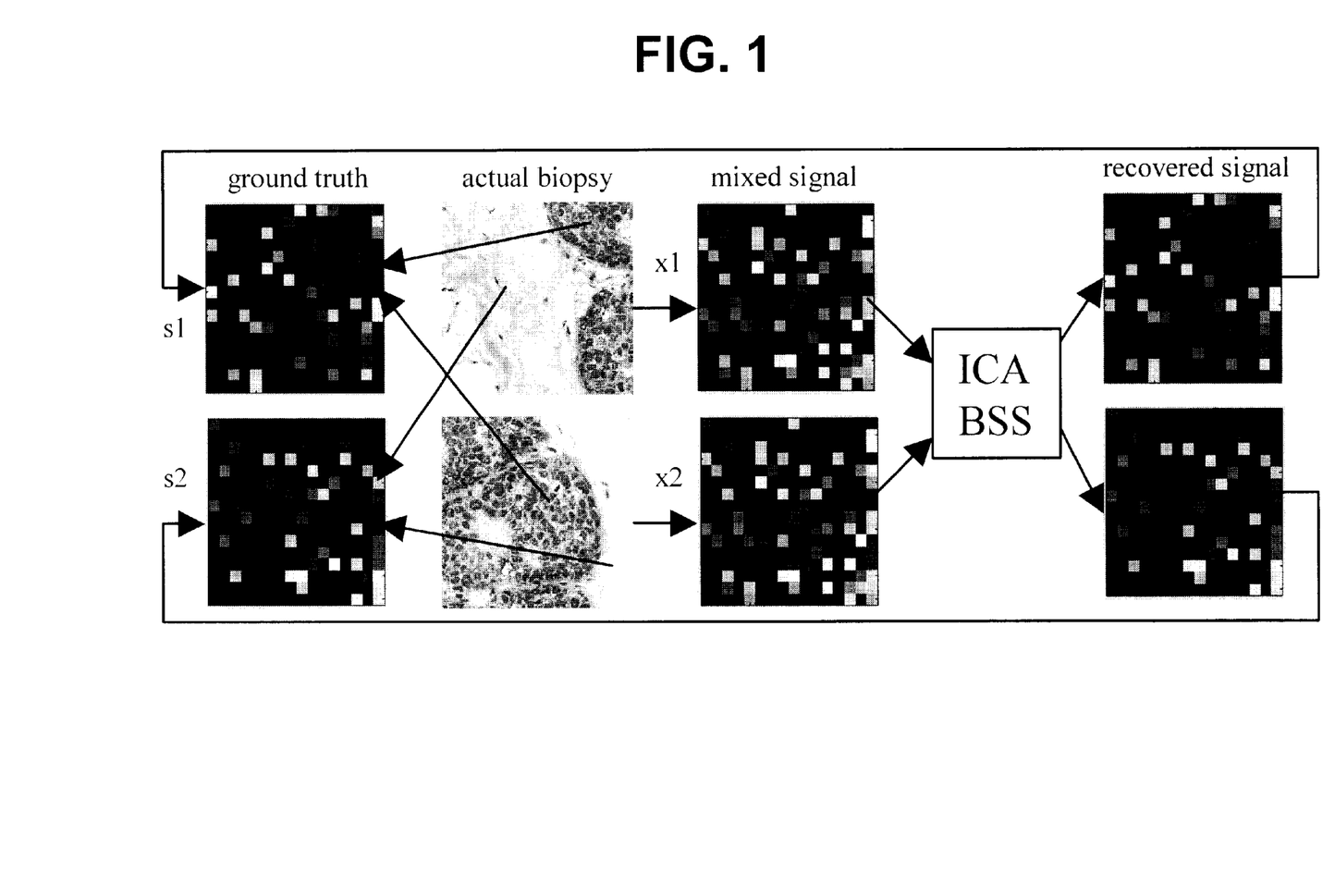
FIG. 1 illustrates a unique application of PICA to tissue heterogeneity correction in gene expression microarray profiling, namely BSS.

FIG. 1 illustrates a unique application of PICA to tissue heterogeneity correction in gene expression microarray profiling, namely BSS. In a clinical setting, most needle biopsies contain both mutated cells (e.g., cancer cells) and surrounding normal cells (e.g., stromal cells). The microarray gene expression profiling may acquire the signals from mixed cell populations. This approach uses a computational method to blindly decompose the composite signals and thus may recover the original gene expression profiles of pure cell populations.

It should be understood that the index selection scheme of the present invention may be extended by using a nonlinear (e.g., piece-wise linear) regression/correlation analysis to take into account higher-order correlations, which may be shown to be equivalent to statistical independence.

Neuro-Transporter Binding Separation in PET

In recent years a whole range of radioligands have been developed for imaging neuro-transporters in the brain. Some ligands, such as $C^{11}McN^+5652$, although highly sensitive for their target, e.g., the serotonin transporters (SERT), the nonspecific binding component is significant. The estimation of the true distribution of specific binding sites and the associated kinetic parameters is an essential step for multiple reasons. The task is to decompose mixed specific and nonspecific binding components based on the different kinetics of the radioligand at the binding sites, such as cerebellum, corpus striatum and cerebral cortex.

Suggested by a compartmental model, as shown by R. N. Gunn, Steve R. Gunn, and V. J. Cunningham, "Positron emission tomography compartmental models," *J. Cerebral Blood Flow and Metabolism*, vol. 21, no. 6, pp. 635–652 (2001), the entire contents and disclosure of which is hereby incorporated by reference, specific binding $C_S(t)$ and nonspecific binding plus free and trapped ligand $C_{NS}(t)$ during the relaxation phase are related as shown below in equation 6:

$$\begin{bmatrix} \dot{C}_S(t) \\ \dot{C}_{NS}(t) \end{bmatrix} = K \begin{bmatrix} C_S(t) \\ C_{NS}(t) \end{bmatrix}, K = \begin{bmatrix} -k_4 & k_3 \\ k_4 & -k_2 - k_3 \end{bmatrix}, \quad \text{Equation 6}$$

where $k_2$ is the release from nonspecific binding sites back into circulation, $k_3$ is the binding to specific binding sites, and $k_4$ is the release from specific binding sites. There are two major potential limitations associated with such compartmental analysis. First, the kinetics components are often externally detected that may lead to an incorrect measure of concentration. A second problem is specific to the lack of spatial information. Thus, various regions implying different kinetics are summed on the measurement, but in unknown proportions from one pixel to another.

The present invention redefines the specific binding and nonspecific binding activities at time t and pixel i as factored time-spatial functions: $C_S(t, i)=L_S(t)R_S(i)$ and $C_{NS}(t, i)=L_{NS}(t)R_{NS}(i)$, where R(i) is the receptor density at pixel i and L(t) is the ligand availability at time t. The factored time-spatial compartmental model is shown below in equation 7:

$$\begin{bmatrix} \dot{L}_S(t)R_S(i) \\ \dot{L}_{NS}(t)R_{NS}(i) \end{bmatrix} = K \begin{bmatrix} L_S(t)R_S(i) \\ L_{NS}(t)R_{NS}(i) \end{bmatrix}, \quad \text{Equation 7}$$

where $L_S(t)R_S(i)$ and $L_{NS}(t)R_{NS}(i)$ are interpreted as the specific and nonspecific binding potentials respectively. It may be shown that the solution to such a linear state equation takes the following general form shown below in equation 8:

$$\begin{bmatrix} L_S(t)R_S(i) \\ L_{NS}(t)R_{NS}(i) \end{bmatrix} = H(t, t_0) \begin{bmatrix} L_S(t_0)R_S(i) \\ L_{NS}(t_0)R_{NS}(i) \end{bmatrix}, \quad \text{Equation 8}$$

where $H(t, t_0)$ is the transition matrix. The observed PET signals $x(t, t_0)=C_S(t, i)+C_{NS}(t, i)$ are expressed as shown below in Equation 9:

$$x(t, i) = h_L(t, t_0) \begin{bmatrix} R_S(i) \\ R_{NS}(i) \end{bmatrix} \quad \text{Equation 9}$$

and explicitly unify compartmental modeling and factor analysis, in which each factor (i.e., fundamental kinetics) $h_L(t, t_0)$ is interpreted as the time-course of ligand availability and each factor image (i.e., factor weights) is interpreted as the spatial distribution of receptor density.

Based on the dynamic observations x(t, i), factor analysis has been developed to estimate both factors and factor weights through iterative principal component analysis.

However, the criterion that minimizes the reconstruction error is suboptimal with respect to binding separation, since such criterion may only impose the independence of factor images up to the second order and constrains the column vectors of $h_L(t, t_0)$ to be orthogonal, causing a rather poor overall separation. Based on a priori knowledge that the spatial patterns of specific and nonspecific binding sites are statistically independent and the associated pharmacokinetics are different over time but not necessarily orthogonal, the present invention may separate the mixed binding components using an ICA technique as has been described herein.

Over an informative index subspace (i.e., within brain tissue area), the specific and nonspecific binding sites are defined as two statistically independent sources. The result is an m×1 observation vector related to binding site density as shown below in equation 10:

$$\begin{bmatrix} x(t_1, i) \\ \vdots \\ x(t_m, i) \end{bmatrix} = \begin{bmatrix} h_L(t_1, t_0) \\ \vdots \\ h_L(t_m, t_0) \end{bmatrix} \begin{bmatrix} R_S(i) \\ R_{NS}(i) \end{bmatrix}, \quad \text{Equation 10}$$

where binding separation exploits primarily temporal diversity in that the images taken over different times producing realizations of the observation carry different mixtures of the sources, and the task is to estimate the inverse of the pharmacokinetics matrix $H_L(t, t_0)$ and recover the factor images $R_S(i)$. Since m>2, the basic prior art ICA model does not hold anymore. Performing ICA on the mixtures in such a case requires special care. The present invention thus proposes schemes to meet such requirements.

Figure 2A:
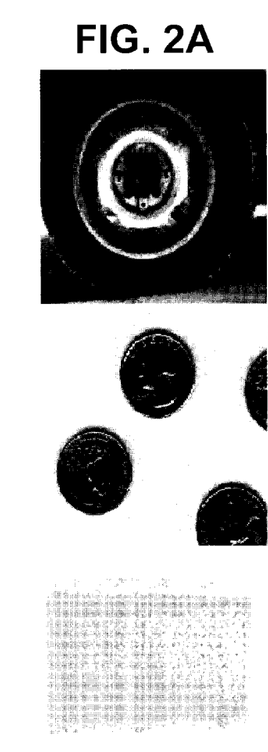
FIG. 2A illustrates two original sources and a corresponding scatter plot.
Figure 2B:
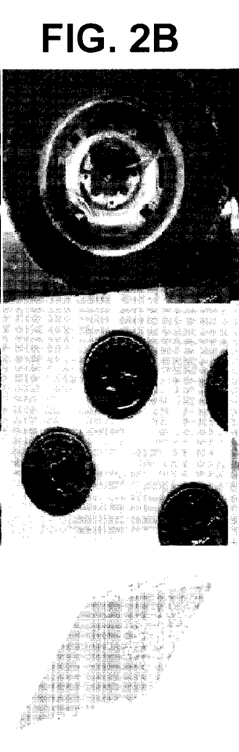
FIG. 2B illustrates two mixtures of the original sources and a corresponding scatter plot.

The present invention demonstrates the performance of the FastPICA method on a simple image separation problem. Observations were generated from two digital images given in FIG. 2A, each with a unique background and object pattern (i.e., tire and coin) and a corresponding scatter plot. The images were mixed by a randomly generated 2×2 nonsingular matrix. The resultant images are presented in FIG. 2B with a corresponding scatter plot.

Figure 2C:
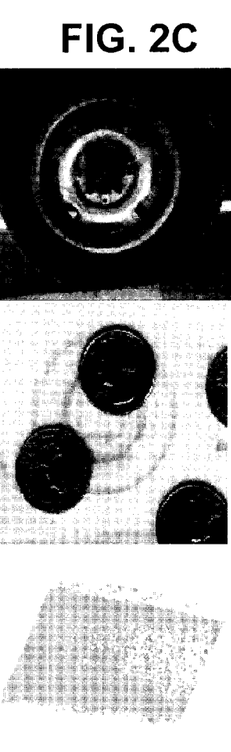
FIGS. 2C and 2D illustrate the results of FastICA and FastPICA on image separation and recovered scatter plots.
Figure 2D:
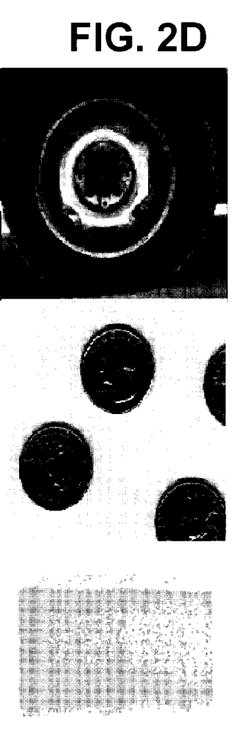

Experiments are conducted over several runs of the FastICA and FastPICA algorithms, each with a different random mixing matrix. FIGS. 2C and 2D show the typical outcomes. With this experiment, the basic principle and capable nature of the FastPICA method are evident as the FastPICA method, using only independent portions of the observations, successfully separates two image patterns in FIG. 2D which have been insufficiently recovered by FastICA in FIG. 2C.

Figure 3A:
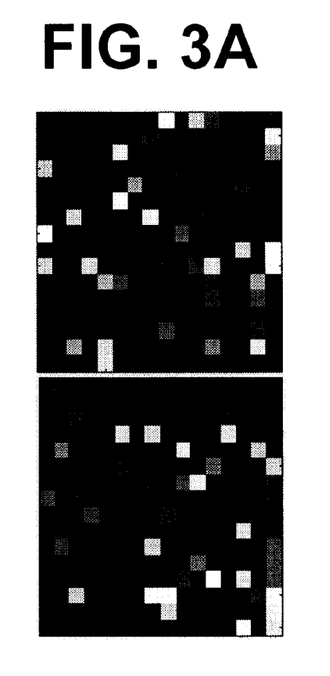
FIG. 3A illustrates two original sources of microarray gene expressions.
Figure 3B:
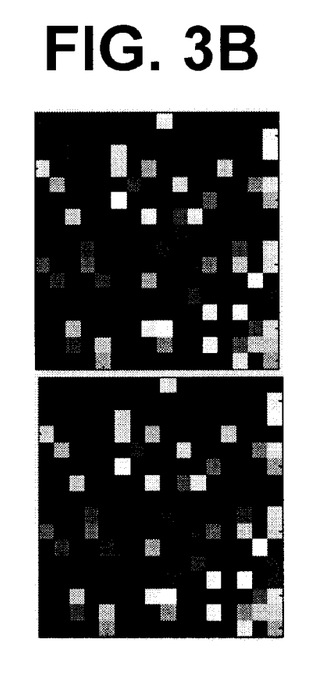
FIG. 3B illustrates two mixtures of the two original sources.

The second experiment reports the effectiveness of FastPICA in PVC on real microarray gene expressions. The data set consists of 2308 effective gene expressions from two samples of neuroblastoma and non-Hodgkin lymphoma cell tumors. Source and mixed signals are given in FIGS. 3A and 3B respectively. In this case, two gene expression profiles are clearly dependent over most of the genes. Based on an initial application of FastICA, gene selection is conducted, followed by FastPICA.

Figure 3C:
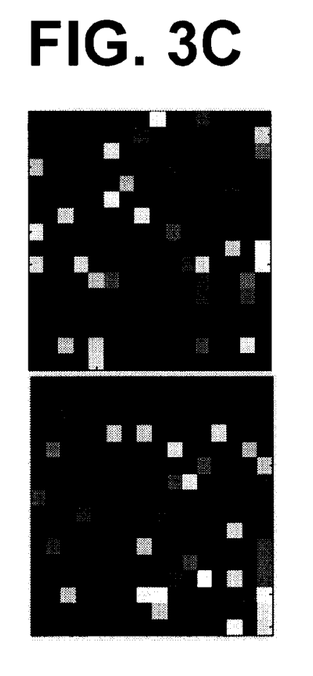
FIG. 3C illustrates partial volume correction on gene expression by FastPICA.

The original 2308 genes were ranked by their differentiation power between the two classes and the top 256 genes were retained for FastPICA analysis. The results are shown in FIG. 3C. Blind source separation by FastPICA in FIG. 3C paralleled the original signals in FIG. 3A almost perfectly. Many independent trials using other gene sets reached a similar result. While the optimality of this technique may be data-dependent, the results make this FastPICA method a very effective tool in such applications.

Figure 4:
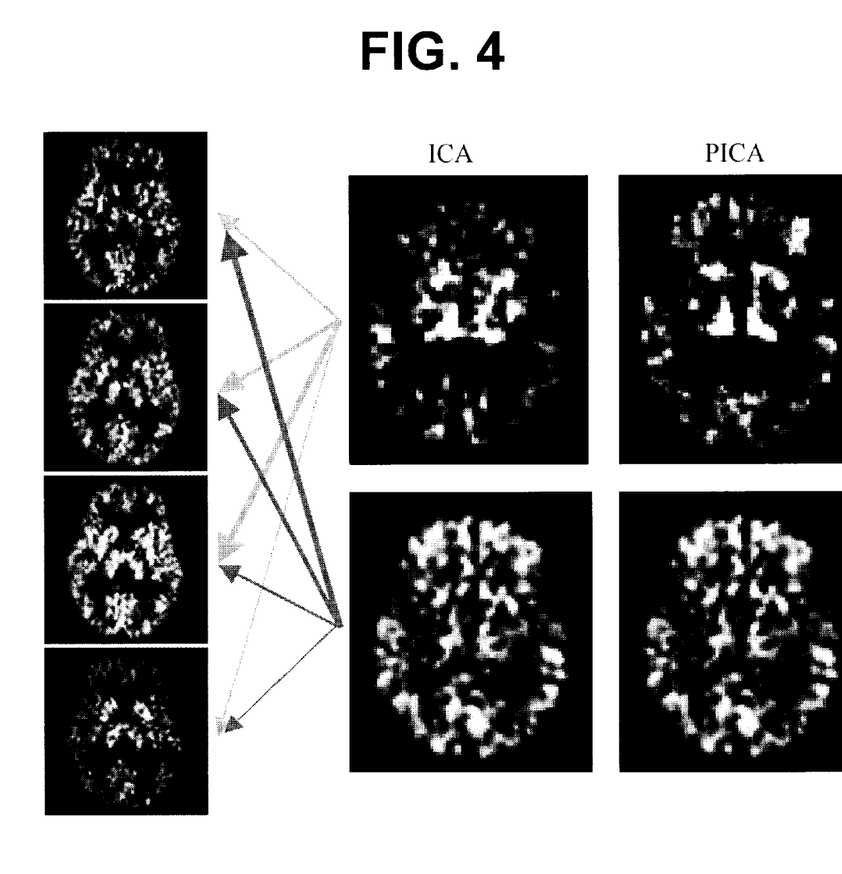
FIG. 4 illustrates the observed dynamic positron emission tomography (PET) of the brain (left) and the reconstructed factor images (spatial distribution of receptor) by ICA (middle) and PICA (right) methods.

FIG. 4 shows the observed dynamic positron emission tomography (PET) of the brain (left) and the reconstructed factor images (spatial distribution of receptor) by ICA (middle) and PICA (right) methods.

Further applications of FastPICA to independent component imaging are contemplated within the scope of the present invention, such as using multiple radioligands for brain and cancer research, where the central issues are noise reduction, estimating mixing matrix, and normalization in comparative studies.

Several other applications of both ICA and/or PICA, in a broad sense covering blind partially-independent source separation (BPISS), are considered below.

EXAMPLE I

The methods or apparatus of the present invention may be used for partial volume correction, for example, in microarray expressions, and possibly many other biotech/biomedical signal extraction applications when signals are mixed or contaminated, such as gene expression in functional genomics, protein expression in proteomics, etc.

Figure 5:
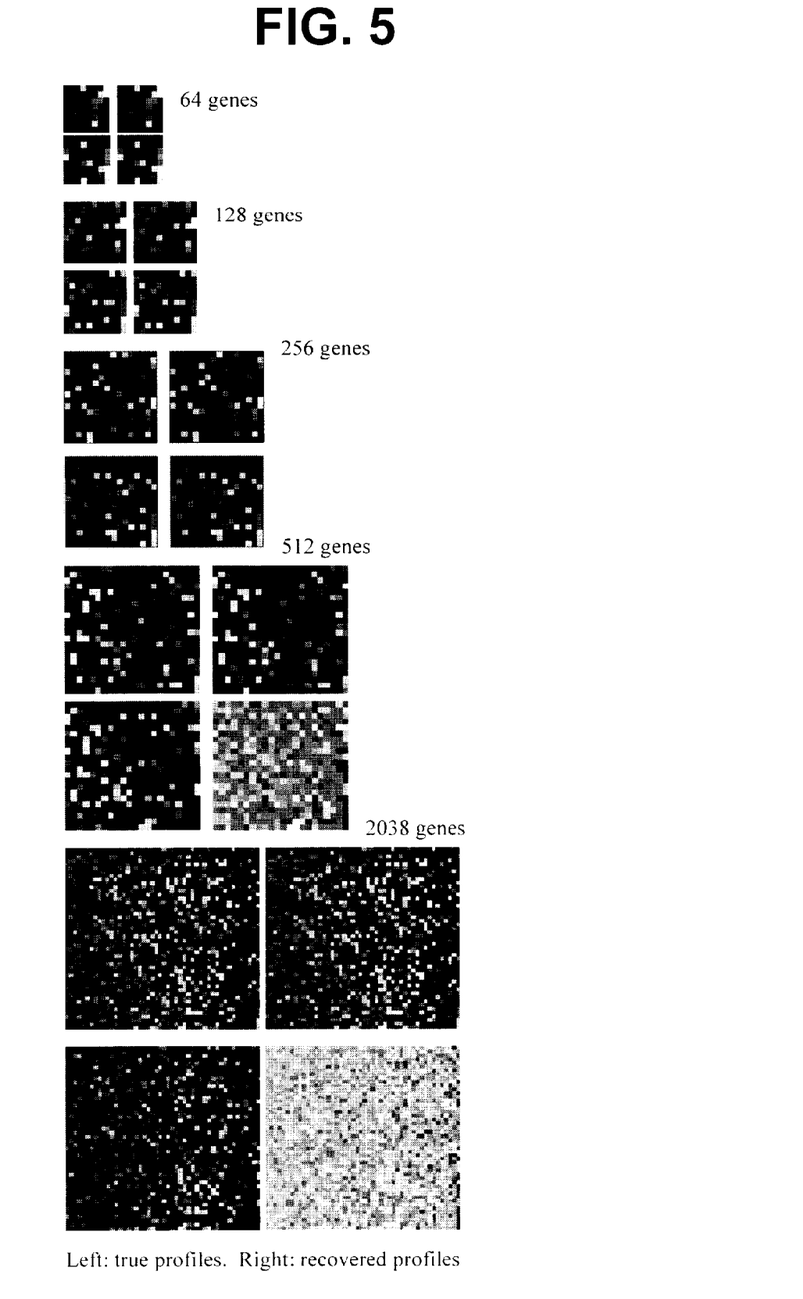
FIG. 5 illustrates the results and comparisons of original gene expression profiles and the recovered gene expression profiles by PICA-BSS, using a different number of differentially-expressed genes, for tissue heterogeneity correction in gene expression microarray profiling.

For example, FIG. 5 illustrates the results of PICA-BSS for tissue heterogeneity correction in gene expression microarray profiling. The left column shows the ground truth from purified cell line studies. The right column shows the recovered source signals using PICA-BSS. Each row corresponds to the decomposition result using a different number of differentially-expressed genes.

EXAMPLE II

The methods of the present invention may be used for PET (functional/molecular imaging), to separate different binding sites (i.e., receptors, reporters, etc.) from the dynamic imaging sequences, blindly, since the pharmacokinetics of the multiple ligands (i.e., probes, contrast agents, etc.) have different behaviors in connection with different binding sites over time. The present invention allows for multiple binding separation (i.e., more than two components), whereas the prior art method, factor analysis (FA), has been used to separate only two components, namely, specific and nonspecific bindings.

EXAMPLE III

The methods of the present invention may be used for Dual-Energy (DualE) and Multi-Energy (MultiE) x-ray imaging of the human body. Since the x-ray (as well as many other transmission or emission energies) has different absorption spectrum over its energy levels when interacting with different materials such as soft tissues, bones, etc. The acquired signals/images will be the mixture of different components. Such a mechanism satisfies the ICA/PICA model of the present invention.

EXAMPLE IV

Figure 6:
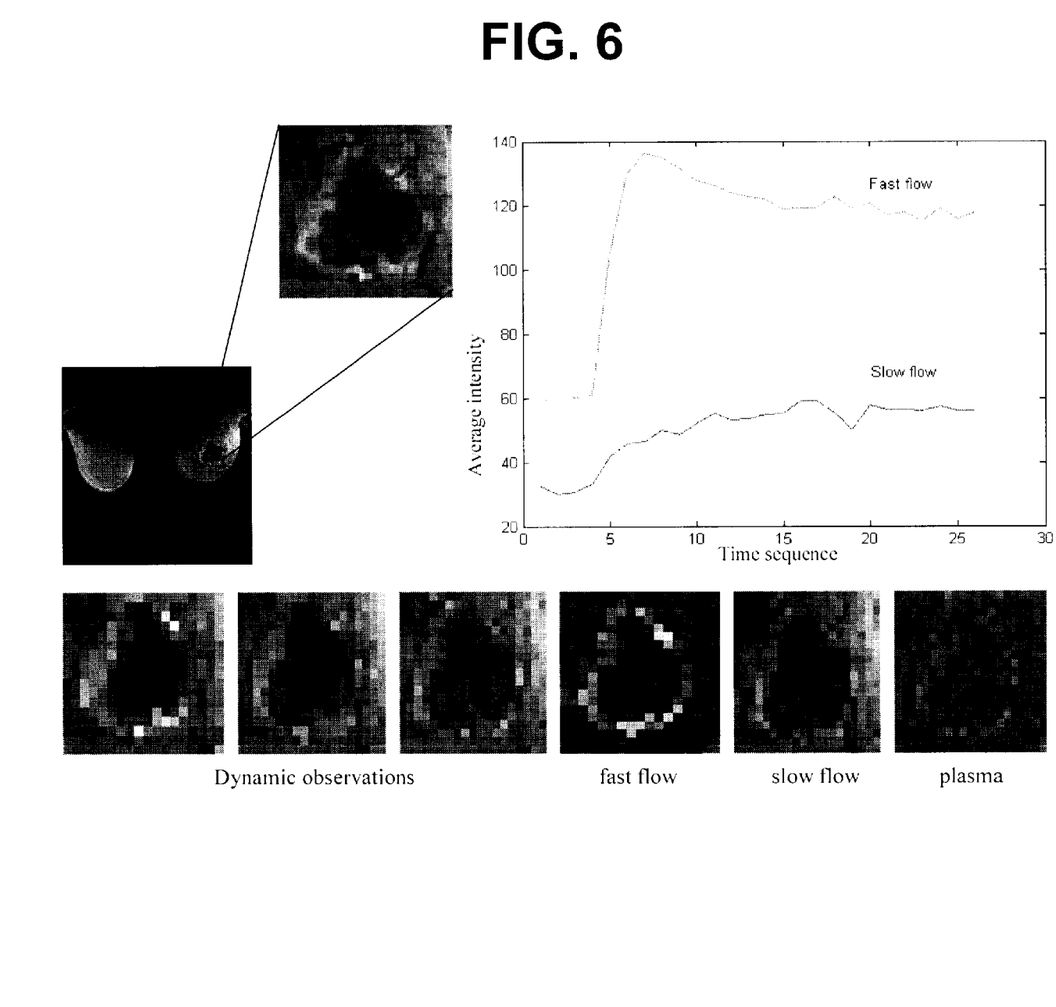
FIG. 6 shows the application of PICA, namely BSS, used to perform permeability pattern decomposition of a breast cancer tumor (e.g., fast flow vs. slow flow through microvascularization) and which may be acquired by a dynamic contrast-enhanced magnetic resonance image.

As shown in FIG. 6, application of PICA, namely BSS, may be used to perform permeability pattern decomposition of a breast cancer tumor (e.g., fast flow vs. slow flow of microvascularization) and may be represented in a dynamic contrast-enhanced magnetic resonance image. Using this method, three critical parameters (blood volume, vessel permeability, and vessel perfusion) can be quantified.

EXAMPLE V

Figure 7:
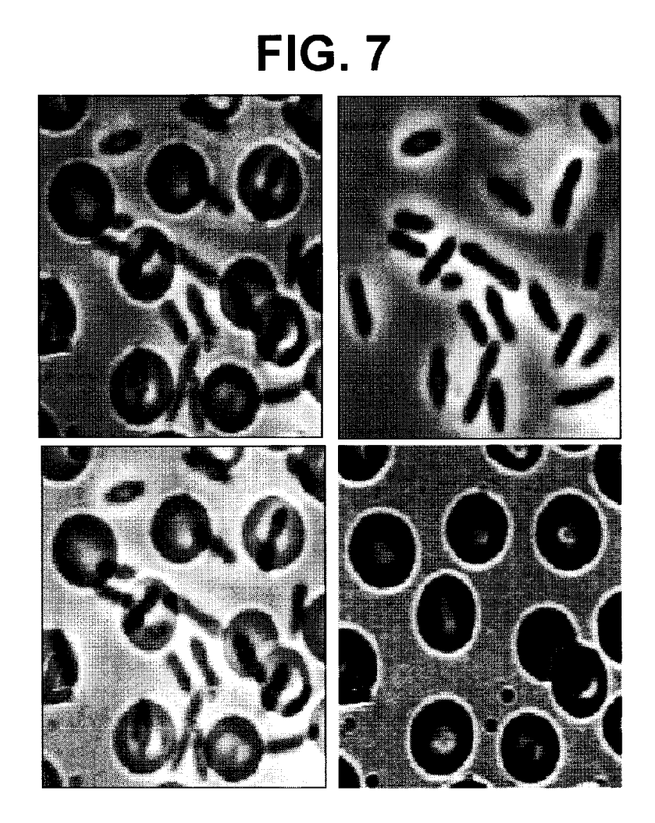
FIG. 7 shows results of PICA based BSS used to separate different cell populations from mixed samples.

As shown in FIG. 7, PICA based BSS may be used to separate different cell populations from mixed samples. Mixed two-cell populations are shown on the left and separated cell populations are shown on the right.

The methods of the present invention may also be extended for use in a wide variety of other imaging applications, including defense/security imaging applications.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for analyzing images, said method comprising the steps of:

A. Acquiring a digital image of an observation, said digital image being observation data;
   B. Vectorizing said observation data to generate an observation vector x(i);
   C. Determining a de-mixing matrix W;
   D. Determining an output vector y(i)=Wx(i);
   E. Recovering a source vector S(i), where S(i)=y(i); and
   F. Utilizing said source vector S(i) to analyze said image.

2. The method recited in claim 1, wherein said statistically mutually independent sources are gaussian.

3. The method recited in claim 1, wherein said statistically mutually independent sources are nongaussian.

4. The method recited in claim 1, wherein said step of determining a de-mixing matrix comprises the following steps:

A. Centering said observation data to make its mean zero and where $C=E[xx^T]$;
   B. Choosing an initial demixing matrix W;
   C. Computing y=Wx, $\beta_k=-E[y_k g(y_k)]$, $\alpha_k=-(\beta_k+E[g'(y_k)])^{-1}$, for k=1, ..., m;
   D. Updating W by $W+\mathrm{diag}(\alpha_k)(\mathrm{diag}(\beta_k)+E[(g)(y)(y)^T])W$;
   E. Decorrelating and normalizing by $W \leftarrow (WCW^T)^{-1/2}W$; and
   F. If not converged, returning to step C, else W has been determined.

5. The method recited in claim 1, wherein said step of determining an output vector y(i) comprises the steps of:

A. Estimating $y^{(j)}=W^{(j)}x$ by FastICA over F for j=0;
   B. Identifying index subspace I according to:

$$\left|\frac{ay_1(i)}{y_2(i)}-1\right| \geq \epsilon, \text{ where } a = \sum_{i=1}^{d} \frac{y_1(i)}{y_2(i)} \Big/ \sum_{i=1}^{d} \frac{y_1(i)^2}{y_2(i)^{2'}};$$

C. Estimating $y^{(i+1)}=W^{(j+1)}y^{(j)}$ by FastICA over i;
   D. Computing $y^{(i+1)}=W^{(j+1)}y^{(j)}$ over F−I; and
   E. If not converged, returning to step B, else y(i) has been determined.

6. The method recited in claim 1, wherein said step of vectorizing said observation data results in the following observation vector:

$$\begin{bmatrix} x(t_1, i) \\ \vdots \\ x(t_m, i) \end{bmatrix} = \begin{bmatrix} h_L(t_1, t_0) \\ \vdots \\ h_L(t_m, t_0) \end{bmatrix} \begin{bmatrix} R_S(i) \\ R_{NS}(i) \end{bmatrix}.$$

7. A method for analyzing images, said method comprising the steps of:

A. Acquiring a digital image of an observation, said data image being observation data;
   B. Vectorizing said observation data to generate an observation vector x(i);
   C. Determining a de-mixing matrix W, wherein said de-mixing matrix is determined by:
      1. Centering observation data to make its mean zero and where $C=E[xx^T]$;
      2. Choosing an initial demixing matrix W;
      3. Computing y=Wx, $\beta_k=-E[y_k g(y_k)]$, $\alpha_k=-(\beta_k+E[g'(y_k)])^{-1}$, for k=1, ..., m;
      4. Updating W by $W+\mathrm{diag}(\alpha_k)(\mathrm{diag}(\beta_k)+E[(g)(y)(y)^T])W$;
      5. Decorrelating and normalizing by $W \leftarrow (WCW^T)^{-1/2}W$; and
      6. If not converged, returning to step 3, else W has been determined;
   D. Determining an output vector y(i)=Wx(i), wherein said output vector is determined by:
      1. Estimating $y^{(j)}=W^{(j)}x$ by FastICA over F for j=0;
      2. Identifying index subspace I according to:

$$\left|\frac{ay_1(i)}{y_2(i)}-1\right| \geq \epsilon, \text{ where } a = \sum_{i=1}^{d} \frac{y_1(i)}{y_2(i)} \Big/ \sum_{i=1}^{d} \frac{y_1(i)^2}{y_2(i)^{2'}};$$

3. Estimating $y^{(i+1)}=W^{(j+1)}y^{(j)}$ by FastICA over I;
      4. Computing $y^{(i+1)}=W^{(j+1)}y^{(j)}$ over F−I; and
      5. If not converged, returning to step 2, else y(i) has been determined;
   E. Recovering a source vector S(i), where S(i)=y(i); and
   F. Utilizing said source vector S(i) to analyze said image.

8. The method recited in claim 7, wherein said statistically mutually independent sources are gaussian.

9. The method recited in claim 7, wherein said statistically mutually independent sources are nongaussian.

10. An apparatus for analyzing images, said apparatus comprising:

A. means for acquiring a digital image of an observation, said digital image being observation data;
   B. means for vectorizing said observation data to generate an observation vector x(i);
   C. means for determining a de-mixing matrix W;
   D. means for determining an output vector y(i)=Wx(i);
   E. means for recovering a source vector S(i), where S(i)=y(i); and
   F. means for utilizing said source vector S(i) to analyze said image.

11. The apparatus recited in claim 10, wherein said statistically mutually independent sources are gaussian.

12. The apparatus recited in claim 10, wherein said statistically mutually independent sources are nongaussian.

13. The apparatus recited in claim 10, wherein said means for determining a de-mixing matrix comprises:

A. means for entering said observation data to make its mean zero and where $C=E[xx^T]$;

B. means for choosing an initial demixing matrix W;

C. means for computing y=Wx, $\alpha_k=-E[y_{kg}(k)]$, $\alpha k=-(\beta_k+E[g'(y_k)])^{-1}, \ldots, m$;

D. means for updating W by $W+diag(\alpha_k)(diag(\beta_k)+E[(g)(y)(y)^T])W$; and E. means for decorrelating and normalizing by $W \leftarrow (WCW^T)^{-1/2}W$.

14. The apparatus recited in claim 10, wherein said means for determining an output vector y(i) comprises:

A. means for estimating $y^{(j)}=W^{(j)}x$ by FastICA over F for j=0;

B. means for identifying index subspace I according to:

$$\left|\frac{ay_1(i)}{y_2(i)} - 1\right| \geq \epsilon, \text{where} \quad a = \sum_{i=1}^{d} \frac{y_1(i)}{y_2(i)} / \sum_{i=1}^{d} \frac{y_1(i)^2}{y_2(i)^{2'}};$$

C. means for estimating $y^{(i+1)}=W^{(+1)}y^{(j)}$ by FastICA over I; and

D. means for computing $y^{(i+1)}=W^{(j+1)}y^{(j)}$ over F–I.

15. The apparatus recited in claim 10, wherein said means for vectorizing said observation data results in the following observation vector:

$$\begin{bmatrix} x(t_1,i) \\ \vdots \\ x(t_m,i) \end{bmatrix} = \begin{bmatrix} h_L(t_1,t_0) \\ \vdots \\ h_L(t_m,t_0) \end{bmatrix} \begin{bmatrix} R_S(i) \\ R_{NS}(i) \end{bmatrix}.$$

16. An apparatus for analyzing images, said apparatus comprising:

A. means for acquiring a digital image of an observation, said data image being observation data;

B. means for vectorizing said observation data to generate an observation vector x(i);

C. means for determining a de-mixing matrix W, wherein said de-mixing matrix is determined by using an apparatus comprising:

1. means for centering observation data to make its mean zero and where $C=E[xx^T]$;

2. means for choosing an initial demixing matrix W;

3. means for computing y=Wx, $\beta_k=-E[y_kg(y_k)]$, $\alpha_k=-(\beta_k+E[g'(y_k)])^{-1}$, for $k=1, \ldots, m$;

4. means for updating W by $W+diag(\alpha_k)(diag(\beta_k)+E[(g)(y)(y)^T])W$; and 5. means for decorrelating and normalizing by $W \leftarrow (WCW^T)^{-1/2}W$;

D. means for determining an output vector y(i)=Wx(i), wherein said output vector is determined by an apparatus comprising:

1. means for estimating $y^{(j)}=W^{(j)}x$ by FastICA over F for j=0;

2. means for identifying index subspace I according to:

$$\left|\frac{ay_1(i)}{y_2(i)} - 1\right| \geq \epsilon, \text{where} \quad a = \sum_{i=1}^{d} \frac{y_1(i)}{y_2(i)} / \sum_{i=1}^{d} \frac{y_1(i)^2}{y_2(i)^{2'}};$$

3. means for estimating $y^{(i+1)}=W^{(j+1)}y^{(j)}$ by FastICA over I; and 4. means for computing $y^{(i+1)}=W^{(j+1)}y^{(j)}$ over F–I;

E. means for recovering a source vector S(i), where $S(i)=y^{(\infty)}$; and

F. means for utilizing said source vector S(i) to analyze said image.

17. The apparatus recited in claim 16, wherein said statistically mutually independent sources are gaussian.

18. The apparatus recited in claim 16, wherein said statistically mutually independent sources are nongaussian.

* * * * *